US012486763B2

(12) United States Patent
Ding et al.

(10) Patent No.: US 12,486,763 B2

(45) Date of Patent: Dec. 2, 2025

(54) MAGNETIC NANOEMULSIONS FOR FLUID CONDUCTIVITY ANALYSIS IN SUBSURFACE RESERVOIRS

(71) Applicant: PERM INC., Calgary (CA)

(72) Inventors: Boxin Ding, Calgary (CA); Steven L. Bryant, Calgary (CA); Apostolos Kantzas, Calgary (CA)

(73) Assignee: PERM INC., Calgary (CA)

(*) Notice: Subject to any disclaimer, the term of this patent is extended or adjusted under 35 U.S.C. 154(b) by 0 days.

(21) Appl. No.: 18/330,993

(22) Filed: Jun. 7, 2023

(65) Prior Publication Data

US 2023/0407744 A1 Dec. 21, 2023

Related U.S. Application Data

(60) Provisional application No. 63/354,138, filed on Jun. 21, 2022.

(51) Int. Cl.

*E21B 49/08* (2006.01)
*C09K 8/26* (2006.01)

(52) U.S. Cl.

CPC .......... *E21B 49/0875* (2020.05); *C09K 8/265* (2013.01); *C09K 2208/10* (2013.01)

(58) Field of Classification Search

CPC .............. C09K 8/0875; C09K 2208/10; E21B 49/0875

See application file for complete search history.

(56) References Cited

U.S. PATENT DOCUMENTS

2016/0002523 A1* 1/2016 Huh ........................ E21B 47/11 507/224
2017/0210979 A1* 7/2017 Cairns ...................... C09K 8/72
2017/0361376 A1* 12/2017 Murugesan .............. B01J 13/02
2020/0033222 A1* 1/2020 Bryant .................. G01M 3/045
2020/0095495 A1* 3/2020 Pandey .................. C09K 8/588
2020/0127279 A1* 4/2020 Roberts ............... H01M 4/1393
2020/0346942 A1* 11/2020 Abdelfatah ........... C01B 32/914
2022/0049599 A1* 2/2022 Servin ...................... C09K 8/58
2024/0093005 A1* 3/2024 Cao .......................... C08K 3/28

OTHER PUBLICATIONS

Dugstad, O., et al., "Application of Tracers to Monitor Fluid Flow in the Snorre Field: A Field Study," SPE 56427, SPE Annual Technical Conference and Exhibition, Houston, Texas, 1999, 10 pages.

Guan, L., et al., "Advances of Interwell Tracer Analysis in the Petroleum Industry," J Canadian Petroleum Technology 44, 2005, pp. 12-15.

(Continued)

*Primary Examiner* — Silvana C Runyan

(74) *Attorney, Agent, or Firm* — Greer, Burns & Crain, Ltd.

(57) ABSTRACT

Apparatus and methods for determining the fluid conductivity of a fluid network. The method includes injecting a nanoemulsion into the formation, the nanoemulsion including a carrier liquid and nanodroplets. The nanodroplets are stabilized within the carrier liquid by polymer-coated iron oxide nanoparticles. After extracting fluid from the formation, a parameter of the extracted nanodroplets is determined. Based on the determined parameter, the fluid conductivity of the fluid network is determined.

18 Claims, 9 Drawing Sheets

(56) References Cited

OTHER PUBLICATIONS

Gupta, A., et al., "Synthesis and surface engineering of iron oxide nanoparticles for biomedical applications," Biomaterials 26, 2005, pp. 3995-4021.
McDaniel, R. R., et al. "Determining Propped Fracture Width from a New Tracer Technology," SPE 119545, SPE Hydraulic Fracturing Technology Conference, Woodlands, Texas, 2009, 16 pages.
Salman, A., et al., "Analysis of Chemical Tracer Flowback in Unconventional Reservoirs," SPE-171656-MS, SPE/CSUR Unconventional Resources Conference, Calgary, Alberta, Canada, 2014, 22 pages.
Saldungaray, P., et al., "Novel Traceable Proppant Enables Propped Frac Height Measurement While Reducing the Environmental Impact," SPE 151696, SPE/EAGE European Unconventional Resources Conference and Exhibition, Vienna, Austria, 2012, 15 pages.
Shook, G., et al., "Determining Reservoir Properties and Flood Performance from Tracer Test Analysis," SPE 124614, SPE Annual Technical Conference and Exhibition, New Orleans, Louisiana, USA, 2009, 19 pages.
Yang, J., et al., "Optimizing nanoemulsions as fluid flowback additives in enhancing tight gas production," J Petrol Sci Eng 121, 2014, pp. 122-125.
Zheng, Z., et al., "Sonication-Assisted Synthesis of Polyelectrolyte-Coated Curcumin Nanoparticles," Langmuir 26, No. 11, 2010, pp. 7679-7681.

* cited by examiner 100
101i
102i
103i
102e
103e
104i
104e
105ia
110
105ib
111ia
105ic (a)

(b)

(c)

(d)

1100
1101i
1102i
1103i
1104i
1110
1105ia
1111ia
1105ib
1105ic

MAGNETIC NANOEMULSIONS FOR FLUID CONDUCTIVITY ANALYSIS IN SUBSURFACE RESERVOIRS

RELATED APPLICATIONS

This application claims 35 U.S.C. 119 priority to U.S. Provisional Patent Application No. 63/354,138 entitled "Magnetic Nanoemulsions for Fluid Conductivity Analysis in Subsurface Reservoirs", filed Jun. 21, 2022, and hereby incorporated by reference in its entirety.

TECHNICAL FIELD

The invention relates to using nanoemulsions for fluid conductivity analysis in subsurface reservoirs. In particular, the invention relates to using magnetic nanoemulsions as tracers to determine the complexity and conductivity of fracture networks in tight reservoirs through flowback analysis, in order to optimize the well performance as well as the subsequent production.

BACKGROUND

Multistage hydraulic fracturing has facilitated the rapid development of tight reservoirs throughout the world in the past decades. A common challenge arising from multistage hydraulic fracturing is an accurate characterization of the complexity and conductivity of the fracture networks, in order to optimize well performance as well as the subsequent production. Tracer injection along with the fracturing fluid and flowback analysis have become routine operations performed on hydraulically fractured wells and are necessary to condition the well for long-term performance.

Radioactive, nuclear, and other chemical materials have been investigated and applied as tracers in the past few decades. Some of the limitations of these techniques may include the ineffective tagging ability at subsurface conditions, inaccurate characterizations and, perhaps most importantly, environmental and regulatory concerns.

To address the environmental and safety concerns associated with the use of radioactive tracers, McDaniel et al. (for references, see bibliography at the end of this summary section) disclose a nuclear taggant that becomes radiative only when irradiated by a neutron source downhole from a logging tool.

Saldungaray et al. propose a non-radioactive high thermal neutron capture compound (HTNCC) as a taggant for data logging.

Salman et al. present analyses of tracer flowback in unconventional reservoirs to determine individual stage flow patterns. The tracers discussed include emulsion tracers.

BIBLIOGRAPHY

The following documents relate to this technology, some of which are referenced throughout this disclosure:

1. Dugstad, O., Aurdal, T., Galdiga, C., Hundere, I. & Torgersen, H. "Application of Tracers to Monitor Fluid Flow in the Snorre Field: A Field Study", SPE 56427, SPE Annual Technical Conference and Exhibition (Houston, Texas, 1999).
2. McDaniel, R. R. et al. "Determining Propped Fracture Width from a New Tracer Technology", SPE 119545, SPE Hydraulic Fracturing Technology Conference. (Woodlands, Texas, 2009).
3. Shook, G., Pope, G. & Asakawa, K., "Determining Reservoir Properties and Flood Performance from Tracer Test Analysis", SPE 124614, SPE Annual Technical Conference and Exhibition (New Orleans, Louisiana, USA, 2009).
4. Salman, A., Kurtoglu, B. & Kazemi, H. "Analysis of Chemical Tracer Flowback in Unconventional Reservoirs", SPE-171656-MS, SPE/CSUR Unconventional Resources Conference (Calgary, Alberta, Canada, 2014).
5. Guan, L., Du, Y., Johnson, S. G. & Choudhary, M. K. "Advances of Interwell Tracer Analysis in the Petroleum Industry". J Can Petrol Technol 44, 12-15, (2005).
6. Saldungaray, P., Palisch, T. & Duenckel, R. "Novel Traceable Proppant Enables Propped Frac Height Measurement While Reducing the Environmental Impact", SPE 151696, SPE/EAGE European Unconventional Resources Conference and Exhibition. (Vienna, Austria, 2012).
7. Zheng, Z. et al. "Sonication-assisted synthesis of polyelectrolyte-coated curcumin nanoparticles". Langmuir 26, 7679-7681 (2010).
8. Gupta, A. K. and Gupta M., "Synthesis and surface engineering of iron oxide nanoparticles for biomedical applications", Biomaterials, 26 (2005) 3995-4021.
9. Yang, J., Jiang, W., Guan, B., Lu, Y. & Qiu, X. "Optimizing nanoemulsions as fluid flowback additives in enhancing tight gas production". J Petrol Sci Eng 121, 122-125, (2014)

SUMMARY

In accordance with the invention, a method is provided for analysing a fluid conductivity of an underground formation, the method comprising:

- injecting a nanoemulsion into the formation, the nanoemulsion comprising dispersed liquid nanodroplets in a carrier liquid, wherein the nanodroplets are stabilized (and functionalized) within the carrier liquid by solid nanoparticles; and
- measuring a parameter of the nanodroplets after the nanodroplets have been injected into the formation to determine the fluid conductivity of the formation.

The method may comprise generating the fluid network by fracking, wherein the fracking comprises injecting a frac fluid into the formation (e.g., under pressure), wherein the frac fluid comprises the magnetic nanodroplets. The fractures may be generated using an acid treatment.

The nanoemulsion may be injected with the frac fluid. The nanoemulsion may be injected as a chase fluid after fracking has taken place (e.g., after an acid treatment).

The frac fluid may comprise a proppant (e.g., sand).

The fracking may comprise multiple frac stages, each frac stage corresponding to a volume of the frac fluid being injected into a different spatial region of the formation, wherein the injected nanodroplets in each frac volume associated with each stage are identifiably different. E.g., the nanodroplets may be formed from different materials. E.g., the dispersed liquid may be different (e.g., different oils, or each having a different additive such as a dye), the nanoparticles may be different from having a different core or a different coating/shell.

The method may comprise extracting a fluid from the formation, and wherein the parameter is measured of the extracted nanodroplets. For example, formation fluid may drive the magnetic nanoemulsions to the surface where it is detected, e.g., through magnetic susceptibility, nuclear magnetic resonance (NMR) and magnetic resonance imaging (MRI) measurements. This may be used to determine the fluid conductivity of the fracture networks.

The method may comprise measuring a parameter of the droplets while they are in the formation. This may help determine the amount and position of the nanoemulsion within the formation. This may be achieved by applying an oscillating magnetic field to the formation and measuring the response of the magnetic nanodroplets.

The solid nanoparticles may be polymer-coated iron oxide nanoparticles.

The hydrodynamic diameter of the nanodroplets may be less than 1 μm. The hydrodynamic diameter of the nanodroplets may be is at least 100 nm.

The nanoemulsion may be injected into the formation via an injection wellbore and at least a one-well portion of the extracted fluid is extracted from the formation via the injection wellbore.

The nanoemulsion may be injected into the formation via an injection wellbore and at least an inter-well portion of the extracted fluid is extracted from the formation via a production wellbore. The production wellbore may be different from the injection wellbore.

The nanodroplets may have maximum dimension of between 100 nm and 1 micron.

The dispersed liquid may comprise hydrocarbons.

The carrier liquid may comprise brine.

The droplets may be generally spherical.

In addition to stabilizing the nanodroplets, the solid nanoparticles may functionalise the nanodroplets in order to allow them to be detected and measured. The solid nanoparticles may be magnetic (e.g., one or more of: paramagnetic or ferromagnetic). The nanoemulsion may be one or more of: paramagnetic or ferromagnetic. The hydrodynamic diameter of the solid nanoparticles may be less than 50 nm. The hydrodynamic diameter of the solid nanoparticles may be greater than 5 nm.

According to a further aspect, there is provided a use of a nanoemulsion to analyse a fluid network within an underground formation, wherein the nanoemulsion comprises dispersed liquid nanodroplets in a carrier liquid, wherein the nanodroplets are stabilized by polymer-coated iron oxide nanoparticles.

According to a further aspect, there is provided nanoemulsion to analyse a fluid network within an underground formation, wherein the nanoemulsion comprises dispersed liquid nanodroplets in a carrier liquid, wherein the nanodroplets are stabilized within the carrier liquid by polymer-coated iron oxide nanoparticles.

The solid nanoparticles may comprise polymer-coated iron oxide nanoparticles.

The method may comprise creating the magnetic nanoemulsion prior to injection.

The method may comprise adjusting parameters of the nanoemulsion based on the subsurface conditions, in order to have minimal retentions in the subsurface. The parameters that are adjusted may include one or more of the following: the droplet size; the salinity of the carrier fluid; and the mass of a polymer coating on the magnetic nanoparticle. Adjusting the volume fraction of oil and concentration of polymer-coated iron oxide nanoparticle could be another two methods for achieving the optimal nanoemulsion systems.

The nanoemulsions may be stable across a range of salt concentrations. This may allow them to remain as a nanoemulsion when they are exposed to formation brine. However, in other cases, the existence of the cations might enhance the ionic binding so that the nanodroplets are interconnected to form a large cluster. When the formative cluster have a size larger than the pore throat diameter, they might be retained by capillary trapping.

Inter-well tracer tests may provide fundamental information on the flow pattern communication characteristics between the injection and production wells as well as the reservoir properties by analyzing the flow trajectories between the injection well and production well and the tracer flowback observed through time. Interpretation of these data depends on several key parameters including: tracer type; injector scheme and well pattern; and well completion and stimulation practices. The interpretation of the tracer flowback data may be adjusted based on these parameters.

In an inter-well configuration, a volume of tracer, referred to as a 'slug', is injected into one well while and extracted from another production well (monitor well). In the one-well configuration, the tracer is injected and extracted from the same well. It will be appreciated that a tracer can be injected into a well, and may be extracted from multiple other wells, which may or may not include the injection well. The tracer breakthrough may occur within days for inter-well configuration while it occurs in minutes to hours per stage in a one-well configuration.

The parameter of the extracted nanoemulsion may comprise a size distribution of the nanodroplets. There may be two possible interactions of the nanodroplets with the fractures when there is significant salinity in the formation. The first one is the capillary trapping of a large oil clusters in pore throats. The large oil cluster is formed due to the interconnected nanodroplets caused by the ionic binding under the saline environments. The other possible interaction is that the cations in the fluid within the fractures is attracted to a negatively charged rock surface. Then the negatively charged nanodroplets are attracted onto the rock surface, causing retention in the porous media.

When there is no or little salinity in the formation, the nanodroplets should not have any direct interaction so that a minimal retention can be achieved in the fractures. This means that the recovered nanodroplets would be the same nanodroplets as were injected. That is, the nanodroplets should be very stable and well dispersed in the carrier fluid/formation water. In addition, the nanoemulsion should have minimal retention in the subsurface.

A size distribution may include information on the relative number of particles as a function of size. The size may be a parameter such as diameter, greatest dimension (i.e., maximum length), volume, equivalent mesh or sieve size, etc. A size distribution may include information on the absolute number of particles within the colloid (e.g., provided as a raw number or a concentration). A size distribution may include information on the volume of carrier fluid/liquid.

The hydrodynamic diameter of a nanodroplet or nanoparticle is defined as the diameter of a perfect sphere that would exhibit the same hydrodynamic friction as the nanodroplet or nanoparticle of interest. Thus, the hydrodynamic diameter value reflects primarily the hydrodynamic friction but is usually also a good estimation of the absolute size of the molecule. The diameter that is measured in dynamic light scattering (DLS) is a value that refers to how a particle/droplet diffuses within a fluid, so it is referred to as a hydrodynamic diameter.

The measured parameter may correspond to a quantity or amount of nanodroplets extracted. This may be expressed in terms of number (e.g., in moles), volume, mass and size of nanodroplets and/or number, volume, mass and size of nanoparticles.

The parameters measured may be time dependent. For example, the quantity of the extracted droplets and/or quantity of the extracted fluid/liquid may be measured as a function of time or as a rate. The extracted fluid may be monitored for extracted droplets for up to 30 days or more.

An extracted carrier liquid parameter of the extracted carrier liquid may be determined. The extracted carrier liquid may comprise recovered injected carrier liquid and/or formation fluid. Injected and/or extracted carrier liquids may be aqueous liquids (e.g., consisting mainly of water, possibly with dissolved salts). The extracted carrier liquid parameter may comprise measuring an ion or salt concentration. The ion or salt concentration measured in the extracted fluid may correspond to a conservative salt or ion. A conservative salt or ion is one which does not typically take part in in water and/or mineral reactions.

The nanodroplet size may have a range between 100 nm to 800 nm. DLS provides three size distributions in terms of the intensity, volume/mass and number. The results in this disclosure are used on the basis of the intensity unless stated otherwise. Therefore, the D10 refers to the size for first 10% intensity while the D90 is the size for 90% intensity. And D50 is usually termed as median droplet size.

The nanodroplets may be spherical or spheroidal in shape. The Dv90 (in terms of volume) of the nanoemulsions may be less than 800 nm, where D is the maximum dimension. The Dv50 of the nanoemulsions may be less than 500 nm, where D is the maximum dimension. The Dv10 of the nanoemulsions may be more than 20 nm, where D is the maximum dimension. These numbers relate to the hydrodynamic diameter of the dispersed nanodroplets or suspended nanoparticles. The nanodroplet includes the surface-modified iron oxide nanoparticles when these are present. The iron oxide nanoparticle is coated with a certain polymer.

The size of the nanodroplets (e.g., injected and/or extracted) may be measured using DLS method. DLS measures and analyses temporal fluctuations in, for example, the intensity or photon auto-correlation function (also known as photon correlation spectroscopy or quasi-elastic light scattering).

Emulsions are generally classified into microemulsions, macroemulsions, and nanoemulsions. In contrast with the thermodynamically stable microemulsions, macroemulsions and nanoemulsions may be only kinetically stable. And the difference between the macroemulsions and the nanoemulsions is the droplet size. For the macroemulsions, the droplet diameter usually ranges above 1 micrometer while the nanoemulsions have diameter lower than 1 micrometer.

Emulsions may be kinetically stabilized by surface-active species known as surfactants, which minimize the interfacial tension between both phases. As opposed to conventional surfactants, solid particles that may be anchored to the surface of the droplet to stabilize the emulsion. Emulsions stabilized by solid particles are known as Pickering emulsions. In a Pickering emulsion, to be adsorbed at the interface, the solid particles should display a double affinity for both phases to be wetted by the two liquids. Once adsorbed at the interface, particles are considered to be irreversibly anchored (contrary to small surfactants), rendering Pickering emulsions more stable than conventional emulsions in terms of months or even years.

Acid fracturing may use hydrochloric acid (HCl) 15 wt. %. To obtain more acid penetration and more etching, 28 wt. % HCl is sometimes used as the primary acid fluid. In other embodiments, formic acid (HCOOH) or acetic acid (CH 3 COOH) may be used because these acids are easier to inhibit under high-temperature conditions.

Wells may be vertical or horizontal wells.

Measuring a parameter of the extracted nanodroplets may comprise determining the absence or presence of nanodroplets in the extracted fluid.

A nanoemulsion may have hydrodynamic diameter between 100 nm to 1 μm.

Brine may contain at least 600 mM of salt.

The nanodroplet may comprise an identifiable chemical dissolved in the liquid nanodroplet. This may allow different nanoemulsions to be identified after being recovered or extracted from the formation. Nanoemulsions with different identifiable chemicals may be injected into different frac stages to allow the effectiveness of different frac stages to be determined.

The matrix may be considered to be the finer grained, interstitial particles that lie between larger particles or in which larger particles are embedded in sedimentary rocks of the formation such as sandstones and conglomerates.

Pore-throat sizes (diameters) are generally greater than 2 μm in conventional reservoir rocks, range from about 2 to 0.03 μm in tight-gas sandstones, and range from 0.1 to 0.005 μm in shales.

Typical proppant sizes are generally between 8 and 140 mesh (106 μm-2.36 mm), for example 16-30 mesh (600 μm-1180 μm), 20-40 mesh (420 μm-840 μm), 30-50 mesh (300 μm-600 μm), 40-70 mesh (212 μm-420 μm) or 70-140 mesh (106 μm-212 μm). For example, the proppant may be sized using two meshes so that the proppant added is small enough to pass through a first coarser mesh (e.g., 20 mesh) but too big to pass through a second finer mesh (e.g., 70 mesh). This gives an upper and lower bound on the size distribution of the proppant.

In the context of this disclosure, a formation may be considered to be a rock formation or a geological formation. A formation is a volume or body of rock which shows a consistent and homogeneous set of lithologies that allow to distinguish it from the neighboring sedimentary rocks and that can be mapped in geological maps. The thickness of formations may range from less than a meter to several thousand meters. A frac network may be within one formation or span across multiple formations.

In the context of this disclosure, a fluid is a substance that can flow. A fluid typically comprises a liquid and/or a gas. A fluid may include particles or grains within a carrier liquid.

Fracking pressures may be between 4,500 psi (30,000 kPa) and 9,000 psi (60,000 kPa) or more.

Formation fluid may be considered to be fluid extracted from the formation which was not injected into the formation. Extracted fluid may be considered to be fluid extracted from the formation after first being injected into the formation from the surface.

The technology may be used as a tracer for flowback analysis in tight reservoirs. The principles behind the technology can be extrapolated for use in areas related to minimal retentions of the contrast agents in confined porous media, such as geothermal recovery, environmental remediation, drug delivery, diagnostic imaging, and fuel cells.

Transport of nano-colloidal dispersions (e.g., nanofluids, nanoemulsions, nanofoams) in porous media is a ubiquitous phenomenon in various industries, such as subsurface energy recovery, environmental remediation, drug delivery, diagnostic imaging, proton-exchange membrane fuel cells, etc. One major concern in all these applications is the aggregation and deposition of the nano-dispersed fluids onto the solid surfaces of the porous media. This removes the nano-colloidal dispersions from the bulk fluid, reducing the efficiency and effectiveness of mass/momentum/energy transport or other processes and simultaneously generating significant resistance and clogging in microchannels.

The solid nanoparticles may be coated using other coating materials, e.g., non-polymeric organic stabilizers, polymeric stabilizers, inorganic molecules, targeting ligands (see Gupta, A. K., Gupta, M., Biomaterials, 2005.). The solid nanoparticles may comprise a combination of one or more of: ferrite nanoparticles, maghemite, magnetite, and metallic nanoparticles.

According to a further aspect, there is provided a method for producing a nanoemulsion to analyse a fluid network within an underground formation, wherein the nanoemulsion comprises dispersed liquid droplets in a carrier liquid, wherein the nanodroplets are stabilized within the carrier liquid by solid nanoparticles. the method comprising: emulsifying a mixture comprising: a dispersed liquid, a carrier liquid and solid nanoparticles.

The method may comprise creating a polymer coated solid nanoparticle by sonicating a mixture of uncoated nanoparticles in the presence of a polymer within a sonication fluid (e.g., water). The uncoated nanoparticles may comprise a metal oxide. The uncoated nanoparticles may comprise iron oxide. The uncoated nanoparticles may be magnetic.

The carrier liquid may comprise a salt solution. The dispersed liquid may comprise a hydrocarbon.

According to a further aspect, there is provided a method for analysing a fluid conductivity of a porous medium, the method comprising:

- injecting a nanoemulsion into the porous medium, the nanoemulsion comprising dispersed liquid nanodroplets in a carrier liquid, wherein the nanodroplets are stabilized within the carrier liquid by magnetic solid nanoparticles;
- extracting a fluid from the porous medium;
- measuring a parameter of the extracted droplets in the extracted fluid; and
- analysing the fluid conductivity of a porous medium based the measured parameter of extracted nanodroplets.

According to a further aspect, there is provided an apparatus for determining the fluid conductivity of the fluid network, the apparatus comprising:

- a wellbore positioned within a formation;
- a nanoemulsion source, the nanoemulsion comprising dispersed liquid nanodroplets in a carrier liquid, wherein the nanodroplets are stabilized within the carrier liquid by magnetic solid nanoparticles;
- a pump for injecting the nanoemulsion into the formation from the nanoemulsion source via the wellbore;
- a container for containing fluids extracted from the wellbore;
- an analyser for measuring a parameter of the extracted droplets in the extracted fluid; and
- a controller for determining the fluid conductivity of the fluid network based on the measured parameter of extracted droplets.

The analyser may comprise one or more of: a DLS analyser, a magnetic susceptibility sensor/system, a Nuclear Magnetic Resonance (NMR) analyser, a magnetic resonance imager (MRI), a mass spectrometer, a Cryo-SEM, a dielectric measurement system, a computed tomography (CT) system, and any other apparatus that is able to provide a magnetic field. The analyser may comprise a coulter counter.

The analyser may comprise a processor and memory. The memory may store computer program code. The processor may comprise, for example, a central processing unit, a microprocessor, an application-specific integrated circuit or ASIC or a multicore processor. The memory may comprise, for example, flash memory, a hard-drive, volatile memory. The computer program may be stored on a non-transitory medium such as a CD. The computer program may be configured, when run on a computer, to implement methods and processes disclosed herein.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

DETAILED DESCRIPTION

Introduction

Figure 1:
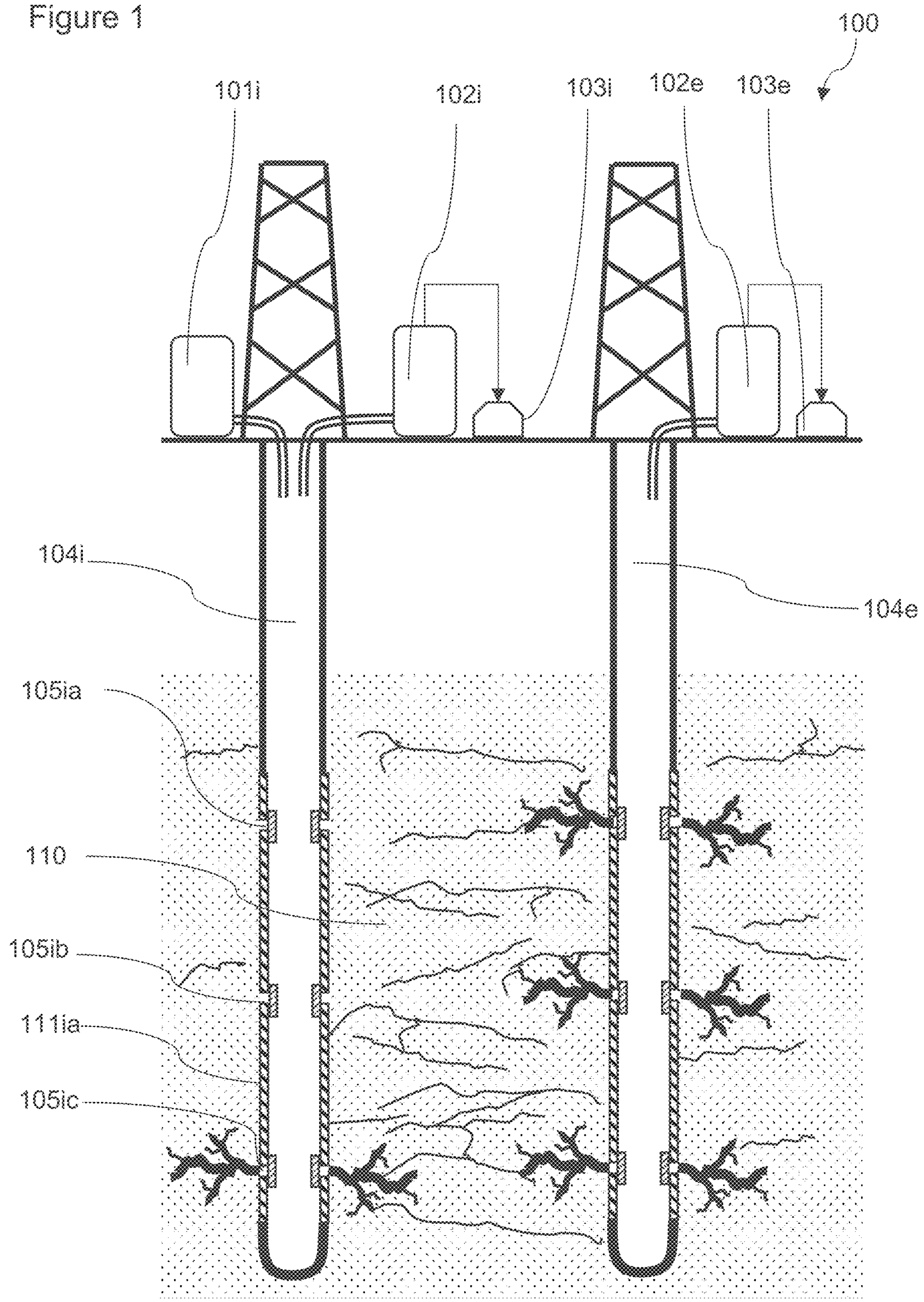
FIG. 1 is a schematic view of an embodiment of a frac assembly with two vertical wells.

Existing techniques for analysing subsurface formations, as described in the background section above, work best only when the concentration of the tracer is uniform. In addition, the logging speed and the location of the source and detectors (e.g., for radioactive tracers) may also limit the development and application of those technologies. Furthermore, the effects of borehole environments and borehole conditions can also affect the accuracy of the fracture characterizations.

To address one or more of these challenges, a magnetic oil-in-water (O/W) nanoemulsion (NE) is proposed as a flowback tracer option to interpret stage-to-stage production variation and inter-well communication during production.

The present technology relates to a method for designing an oil-in-water NE system as a tracer for flowback analysis in tight reservoirs during frac stage. Specifically, the NEs may be stabilized by polymer-coated iron oxide nanoparticles (PIONP) and may be characterized through oil volume fraction, nanodroplet size, oil-water interfacial tension (IFT) and salinity. The NE is designed such that it can flow through the fractures with fewer or minimal retentions in tight reservoirs. The method for designing such an optimal NE system may involve controlling nanodroplet size, salinity, and mass ratio of polymer/nanoparticle (NP).

The magnetic NE may have one or more of the following advantages:

- nanodroplets can be more easily dispersed in the frac fluid because they are well-stabilized by the PIONP.
- nanodroplet size can be tuned by applying certain emulsification energy.
- a potential inline detection of the NE in the reservoirs can be achieved due to the paramagnetic property of the PIONP.

Regarding inline detection, the magnetic properties of the nanoemulsion may be used to detect the electromagnetic response (and even resonance) of the magnetic nanodroplets in rock pores that are exposed to an oscillating magnetic field. Paramagnetic nanoparticles may align themselves parallel to the applied magnetic field while not retaining magnetic moment after the field is removed. Furthermore, due to their small size, paramagnetic nanoparticles stabilized nanodroplets are mobile even in intense magnetic fields.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Use of Nanoemulsion in Tight Reservoirs

As discussed above, hydraulic fracturing, also called fracking, hydrofracking, and hydrofracturing, is a well stimulation technique involving the fracturing of bedrock formations by a pressurized liquid. The process involves the high-pressure injection of "frac fluid" (usually water, containing sand or other proppants and possibly thickening agents) into a wellbore to create cracks in the deep-rock formations through which natural gas, petroleum, and brine will flow more freely. When the hydraulic pressure is removed from the well, small grains of hydraulic fracturing proppants (either sand or aluminium oxide) hold the fractures open.

FIG. 1 shows an embodiment of a frack assembly 100 comprising first and second vertical wells 104*i*, 104*e*, at least one source of frac fluid 101*i*, vessels 102*i*, 102*e* for capturing fluids extracted from each respective well, and analyser 103*i*, 103*e* for analysing the respective extracted fluids.

In the situation shown in FIG. 1, the second well 104*e* has already been fracked and the first vertical well 104*i* is in the process of being fracked.

The first vertical well 104*i* in this case comprises a series of three frac stages 105*ia*, 105*ib*, 105*ic*. It will be appreciated that wells may have many more frac stages (e.g., up to or more). This allows different portions of a formation 110 to be successively fracked.

In the situation shown in FIG. 1, the first stage 105*ic* furthest away from the surface has been fracked. A variety of systems may be used to control the opening and closing of each frac stage, including, for example, ball drop, sliding sleeves etc.

In this case, the formation itself comprises a network of channels which would facilitate fluid flow through the formation.

Fracking of the first stage 105*ic* is effected by injecting a fluid downhole from the frac fluid source under pressure. The pressure is sufficient to generate fractures in the rock which are then filled with the fracking fluid. In this case, the frac fluid comprises a carrier liquid (e.g., water), proppant (e.g., sand or aluminum oxide), and droplets. The fractures are filled with fracking fluid when the pressure is applied. When the pressure is released after the fractures have been created, the proppant present helps prevent the fractures from collapsing. In this way, a permanent fluid network of fractures is formed.

The nanodroplets in this case form a nanoemulsion with the carrier fluid. The droplets in this case are liquid nanodroplets which are stabilized by polymer-coated iron oxide nanoparticles. In other embodiments, the frac fluid may also comprise a thickening agent or other additives (e.g., acid).

A multi-well system like the one shown in FIG. 1 can operate in several ways. For example, each well may be a production well and remove liquid from the formation. In other embodiments, or in other configurations, one well may act as an injection well to drive the desired product towards the other production well. It will be appreciated that the interpretation of the measured parameters derived from the nanoemulsion will be dependent on how the well is to be used. For example, where one well is an injection well and another well is a production well, it is important to determine the fluid conductivity of the fracture networks between the two wells, i.e., whether fluid can be injected into the injection well and extracted from the formation at the production well. For single well configurations, it is important to determine whether the fracturing allows fluid flow back to the well.

In this case, during fracturing, a volume of nanoemulsion tracer is injected into the first well 104*i*. The nanodroplets are then present in the formation and can pass from the fractures into channels or pores within the rock formation itself.

In this case, the second well has been fractured without a tracer, and only the first well 104*i* is fractured with a fracking fluid containing the nanoemulsion. In this case, the first well may be considered as an injection well, and the second well may be considered as a production well.

After both wells have been fully fracked, there is a network of fractures emanating from various points along both wells. In addition, there is a network of pores and channels through the formation itself.

To analyse the fluid conductivity of the formation (which includes the channels and pores and the fractures), the wells are allowed to produce, and fluid is extracted from the formation. Fluid extracted from the formation may include fluid which had been injected into the formation and then recovered and/or fluid which was already present in the formation and extracted for the first time (e.g., formation brine and/or hydrocarbons).

It will be appreciated that the injected nanoemulsion may be extracted from any, both (or all), or none of the wells connected to the formation. This is described in more detail in Salman et al.

If the nanoemulsion tracer is extracted from both wells, this indicates that there is a network between the two wells that allows fluid to pass between the wells, and that the fractures have remained open to allow the nanoemulsion to pass back into the well into which it was injected.

If the nanoemulsion tracer is not extracted at either well, this indicates that the stimulated area around the injection well has a fluid conductivity so large that it is able to propagate the injected tracer beyond both wells.

If the nanoemulsion tracer is only extracted at the production well, this may indicate that the hydraulic fracture is conductive enough to transport the injected tracer to the production well, but that the hydraulic fractures may have subsequently closed to restrict a route back to the producer well.

If the nanoemulsion tracer is only extracted from the injection well, this may indicate that the fractures did not extend sufficiently into the formation to facilitate a fluid path between the two wells.

The above analysis relates to the presence or absence of the tracer at both wells. It will be appreciated that more complex analyses may be done where the presence of the nanoemulsion tracer is detected in the extracted fluids. In particular, the rate at which the nanoemulsion tracer is extracted may provide additional information on the fluid network.

For example, in a graph of extracted tracer against time, a single well-defined peak may indicate a highly fractured system in which the tracers can move easily. In contrast, a graph showing several temporally spaced peaks, may indicate a sparsely fractured system where each peak corresponds to a separate fracture. In this scenario, the graph represents the aggregated recovery of the tracer, and each peak can be associated with a different fracture.

Method of Designing Nanoemulsions

Figure 2A:
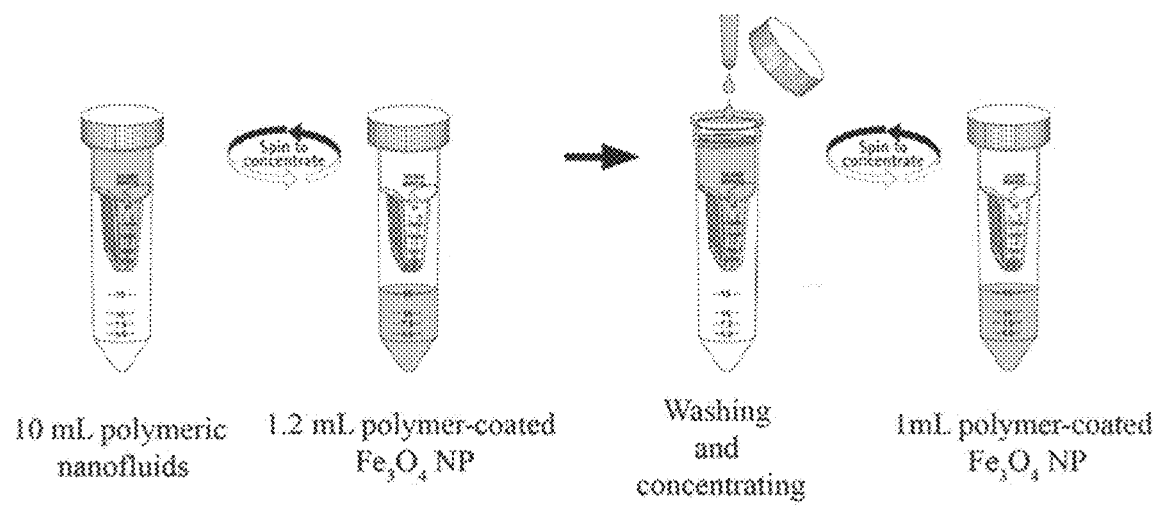
FIG. 2*a* is a schematic diagram showing the steps for the functionalization of the iron oxide nanoparticles (IONPs).

In this example, the polymer-coated iron oxide ($Fe_3O_4$) nanoparticles were synthesized by using a sonication method. Poly(4-styrenesulfonic acid-co-maleic acid) sodium salt-20 kD (PSS-co-MA) was applied as the polymer for synthesis in this disclosure. To remove non-coated iron oxide nanoparticles (IONPs) after the sonication, the solution was firstly centrifuged for 30 mins at 4,000 rpm. The supernatant was then processed by four steps of concentrating and washing with deionized water using 50,000 D centrifugal filter units (Amicon®Ultra-12) as shown in FIG. 2*a*. After three times of centrifuging the samples, the concentration of the PIONP ranges from 15 wt. % to 25 wt. % depending on how well the polymer molecules are attached onto the nanoparticle surface. The mass of polymer coating onto the nanoparticle surface can be affected by the pH value of the carrier fluid, centrifuge times, sonication amplitude and time, temperature, etc.

The polymer coating and IONP core of PIONPs were determined using inductively coupled plasma-mass spectrometry (ICP-MS). The Fe content in the core and S content in the polymer shell were used to evaluate the mass ratio of coating to core. Then, the concentration of PIONP in nanofluid can be determined. In addition, the thermogravimetric analysis (TGA) can also be considered as an alternative method to determine the PIONP concentration and the mass ratio of polymer/IONP. The greater the mass ratio of polymer/IONP indicates more polymer molecule is coated on the IONP, which affects the emulsification and flow behavior of the NE. In this disclosure, four different mass ratios of polymer/NP of 0.6, 0.9, 1.5 and 3.8 were applied for revealing their effects on emulsification and flow behavior. The IONP and PIONP have particle diameters ranging from 20-30 nm.

To emulsify the nanoemulsion, different oils can be selected as the dispersed phase in the NE system, such as crude oil in the field, alkene, alkane, mineral oil, etc. In this example, n-dodecane was applied. We can choose different oils based on convenience, budget, environment, regulatory policy, etc. For example, in field use, crude oil provides the one of best options since it is easily accessible, environmentally benign, and relatively cheap.

Detailed chemicals and sonication parameters are listed in Table 1. Chemical additives include oil (n-dodecane), PIONP, $CaCl_2$ and sonication parameters include amplitude, time, pulse-on/off time. All the NE systems have the same oil volume fraction of 10 vol. %, PIONP concentration of 2.5 wt. %, sonication time of 30 mins and pulse-on/off time of 30 s. Different sonication amplitude, $CaCl_2·2H_2O$ concentration and mass ratio of polymer/IONP were adjusted to control the characteristics of the nanoemulsion. These weight and volume percentages are provided in terms of the total mixture (i.e., including water, $CaCl_2·2H_2O$, PIONP, oil).

It will be appreciated that all parameters have a specific range for adjustments depending on the required characteristics. For example, oil volume fraction can be adjusted from 0.1 vol. %-10 vol. %. PIONP concentration can range from 0.5 wt. % to 10 wt. % in terms of the emulsification behavior and magnetic susceptibility measurements. As indicated in Table 1, the $CaCl_2·2H_2O$ concentration has a range between 0-10 wt. % and the mass ratio of polymer/IONP ranges from 0.6-3.8. High emulsification method with sonication was applied to generate nanodroplets with an amplitude ranging from 20-50.

For sonication amplitudes, the number is a measure of excursion of the tip of the probe. The amplitude is adjustable, and each probe has a maximum amplitude value. For this disclosure, the probe used has a tip diameter of ¾" (19.1 mm) and its amplitude is 60 microns at setting 100(%). At setting 50(%), the amplitude is approximately 30 microns.

The sonication time is highly dependent on the container containing the NE and volume of the NE. For example, the NE has a median size of 150 nm in vial (20 ml) with amplitude of 30 in 5 min sonication while amplitude of 50 in 30 min sonication generates the similar size emulsion in a beaker of 500 ml. Pulse-on/off time should be selected in terms of the heat loss during the sonication process (e.g., to ensure that a threshold temperature, such as 30° C., is not exceeded).

TABLE 1

Chemicals and sonication parameters for emulsification tests. In each case, the oil volume fraction is 10 vol. %, the PIONP concentration is 2.5 wt. %, the sonification time is 30 minutes, and the pulse on time is 30 seconds and the pulse off time is 30 seconds. That is, the sonification is an alternating cycle of 30 second on and then 30 seconds off for 60 cycles giving a total time of 60 minutes, which includes a cumulative period of 30 minutes of sonification and 30 minutes of non-sonification (which may limit the heating of the mixture). The bolded quantities represent different values of the variables investigated in the emulsification tests.

| | | Chemicals | | |
|---|---|---|---|---|
| No. | Variable | $CaCl_2•2H_2O$ concentration (wt. %) | Mass ratio of polymer/NP | Sonication Amplitude |
| 1 | Sonication | 0 | 3.8 | **20** |
| 2 | amplitude | 0 | 3.8 | **30** |
| 3 | | 0 | 3.8 | **40** |
| 4 | | 0 | 3.8 | **50** |
| 9 | $CaCl_2•2H_2O$ | **0** | 3.8 | 50 |
| 10 | concentration | **2.5** | 3.8 | 50 |
| 11 | | **5.0** | 3.8 | 50 |
| 12 | | **10.0** | 3.8 | 50 |
| 13 | Mass ratio of | 0 | **0.6** | 50 |

TABLE 1-continued

Chemicals and sonication parameters for emulsification tests. In each case, the oil volume fraction is 10 vol. %, the PIONP concentration is 2.5 wt. %, the sonification time is 30 minutes, and the pulse on time is 30 seconds and the pulse off time is 30 seconds. That is, the sonification is an alternating cycle of 30 second on and then 30 seconds off for 60 cycles giving a total time of 60 minutes, which includes a cumulative period of 30 minutes of sonification and 30 minutes of non-sonification (which may limit the heating of the mixture). The bolded quantities represent different values of the variables investigated in the emulsification tests.

| | | Chemicals | | |
|---|---|---|---|---|
| No. | Variable | $CaCl_2 \cdot 2H_2O$ concentration (wt. %) | Mass ratio of polymer/NP | Sonication Amplitude |
| 14 | polymer/IONP | 0 | **0.9** | 50 |
| 15 | | 0 | **1.5** | 50 |
| 16 | | 0 | **3.8** | 50 |

The nanoemulsions were characterized through their magnetic susceptibility, nanostructure, rheology, zeta potential, oil-water interfacial tension (IFT) and droplet size.

Figure 2B:
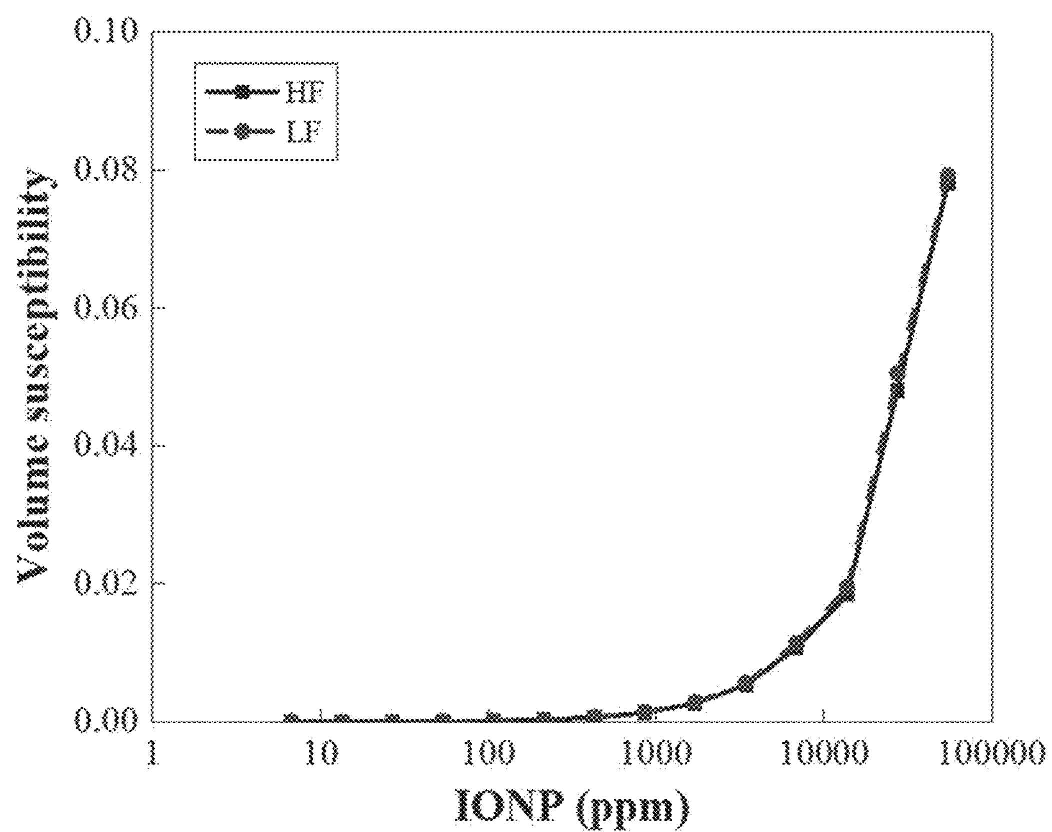
FIG. 2*b* is a graph of the volume susceptibility of the nanoemulsion (NE) with different IONP concentrations.

The magnetic volume susceptibility ($\chi_v^{SI}$) of the NE was firstly assessed as shown in FIG. 2*b*. As shown in FIG. 2*b*, the NE shows paramagnetism when IONP concentration is greater than 6.7 ppm while it exhibits diamagnetism when IONP concentration is lower than 6.7 ppm. When the IONP concentration is diluted to 6.7 ppm, the diluted nanoemulsion has a volume susceptibility of $-5.8\times10^{-7}$ which is lower than 0 and hence diamagnetism. The ppm figures are given in terms of mass fraction.

Figure 3:
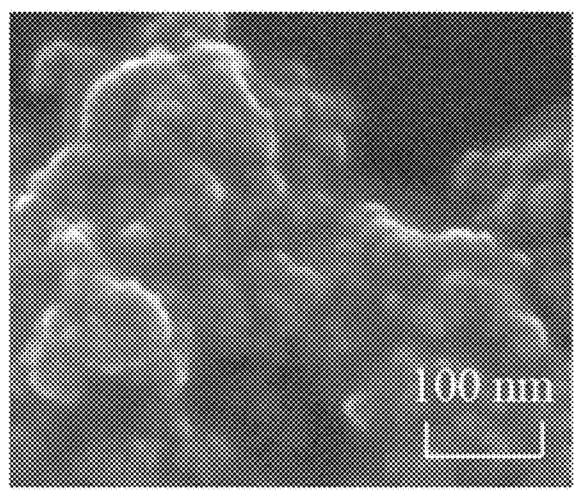
FIGS. 3(*a*)-3(*d*) are SEM images of the nanostructure of the various components of the nanoemulsion system: (a) shows bare/non-coated IONPs; (b) shows a polymer coated iron oxide nanoparticles; (c) shows a nanoemulsion; (d) shows an individual nano-oil-droplet.
Figure 3:
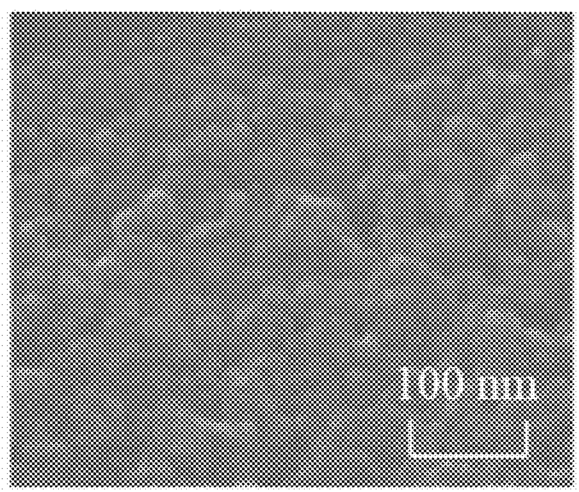
Figure 3:
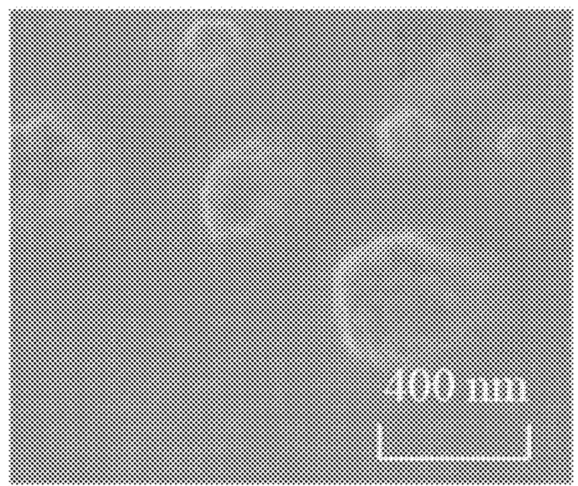
Figure 3:
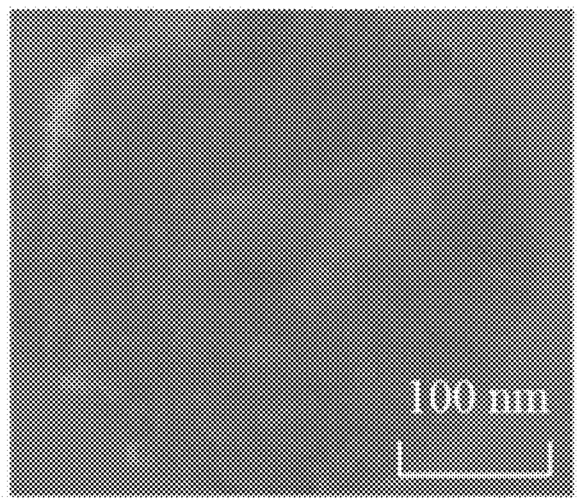

The NE system comprises the PIONP, nanodroplets, and water. The bare/non-coated ION P and PIONP have their nanostructures firstly characterized through SEM and the bulk NE system was screened its nanostructure via CryoSEM™. In the absence of any surface coating, magnetic iron oxide particles have hydrophobic surfaces with a large surface area to volume ratio. Due to hydrophobic interactions between the particles, these particles agglomerate and form large clusters as shown in FIG. 3(*a*). For effective stabilization of iron oxide nanoparticles, often a high density of coating is desirable. As shown in FIG. 3(*b*), the PIONP shows a uniform distribution in the continuous water phase. The CryoSEM™ image in FIG. 3(*c*) shows that the nanodroplets are stabilized by the PIONP shell/cage to prevent them from coalescence such that the nanodroplets are easily dispersed in the continuous water phase. FIG. 3(*d*) shows a large individual nanodroplet caged by high loading of the PIONPs.

Figure 4:
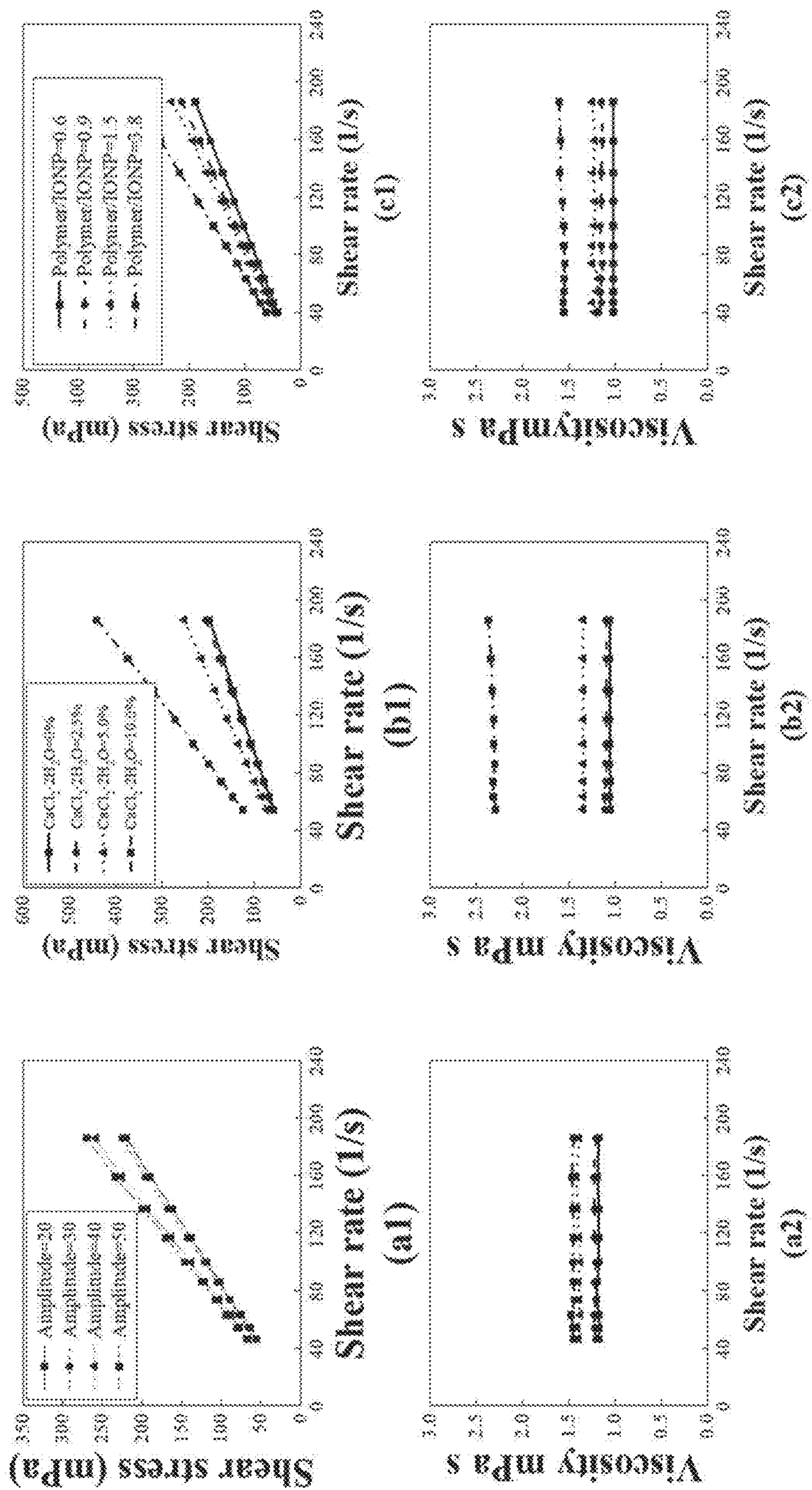
FIGS. 4 (*a*1)-4 (*c*2) are graphs of the rheology of nanoemulsions.

FIG. 4 shows the rheology of the nanoemulsions. 4(*a*1) and 4(*a*2) are respectively graphs of the shear rate dependence of shear stress and the viscosity for different sonification amplitudes. 4(*b*1) and 4(*b*2) are respectively graphs of the shear rate dependence of shear stress and the viscosity for different $CaCl_2 \cdot 2H_2O$ concentrations. 4(*c*1) and 4(*c*2) are respectively graphs of the shear rate dependence of shear stress and the viscosity for different mass ratios of polymer/IONP.

All the nanoemulsions show that the shear stress increases linearly with the shear rate, showing the Newtonian fluid behavior. In addition, the bulk viscosity of the nanoemulsion ranges between 1.0 cP and 2.5 cP. More specifically, the bulk viscosity of the nanoemulsions increase from 1.2 cP to 1.5 cP as the amplitude increases from 20 to 50. Increasing $CaCl_2 \cdot 2H_2O$ concentration from 0 to 10 wt. % leads to an increased viscosity of 1.2 cP to 2.3 cP while bulk viscosity increases from 1.2 cP to 1.5 cP when the mass ratio of polymer/IONP increases from 0.6 to 3.8. All these results show that the nanoemulsion has a bulk viscosity very close to water (about 1 cP at 20° C.), providing for easy transportation and injection in the field.

Figure 5:
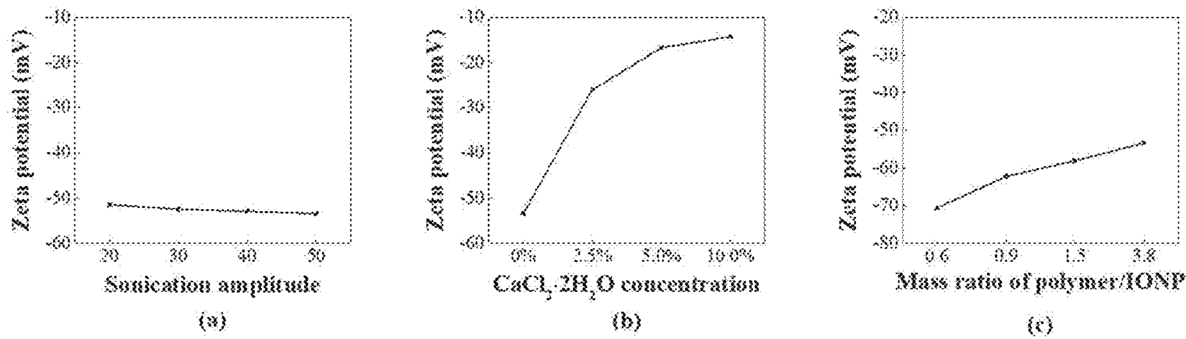
FIGS. 5 (*a-c*) are graphs of the zeta potential of nanoemulsions.

FIG. 5 shows the zeta potential of nanoemulsions. The zeta potentials of nanoemulsions range from −70 to −15 mV depending on the sonication amplitude, $CaCl_2 \cdot 2H_2O$ concentration and mass ratio of polymer/IONP. Specifically, the zeta potential does not change much as the sonication amplitude increases and maintains at approximately −52 mV. As more cations exist in the nanoemulsion, the zeta potential increases from −55 mV to around −15 mV as the $CaCl_2 \cdot 2H_2O$ concentration increases from 0 to 10 wt. %. Since the PIONPs are negatively charged, the nanoemulsion becomes less negative as more PIONPs are adsorbed onto the nanodroplets. Therefore, the zeta potential increase from −70 mV to −50 mV as the mass ratio of polymer/IONP increases from 0.6 to 3.8.

Figure 6:
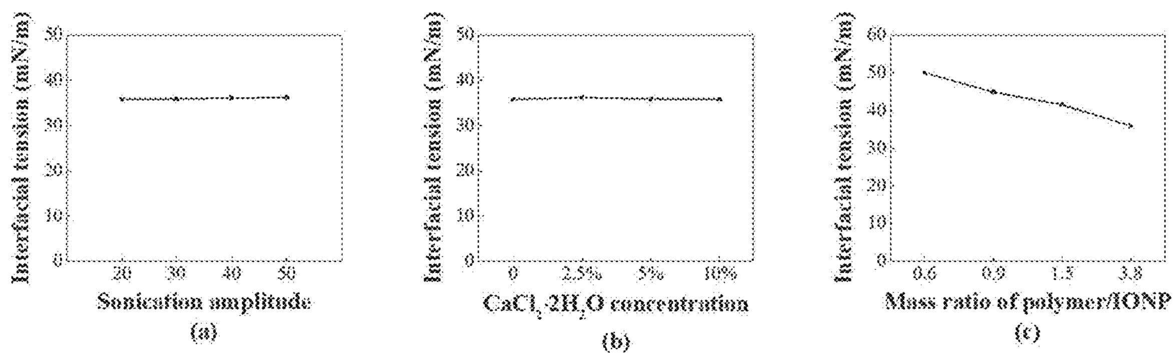
FIG. 6 (*a-c*) are graphs of the oil-water interfacial tension results.

FIG. 6 shows the interfacial tension of nanoemulsions. All the NE systems with different sonication amplitude and $CaCl_2 \cdot 2H_2O$ concentration have the similar oil-water IFT of around 36 mN/m. However, the oil-water IFT shows a decreasing trend as the mass ratio of polymer/NP increases. This might be caused by the polymer molecules are cross-linked to form interconnected PIONPs caging around the nanodroplets, thus decreasing the oil-water IFT.

Figure 7:
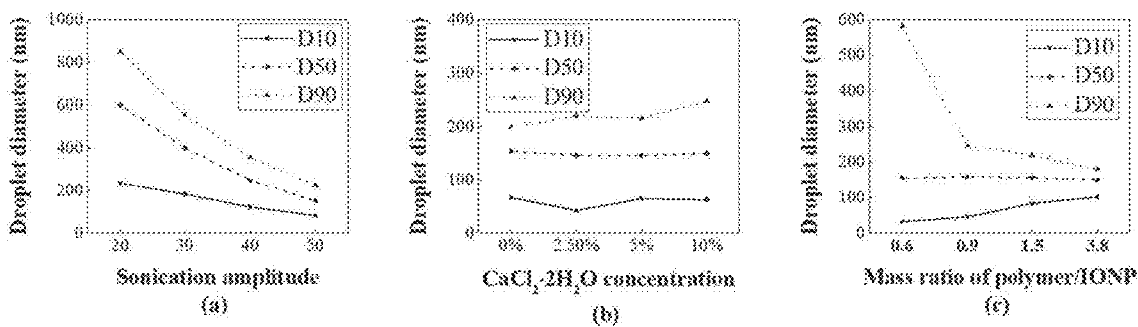
FIG. 7 (*a-c*) are graphs of the hydrodynamic diameter of nanoemulsions.

FIG. 7 shows the nanodroplet size of nanoemulsions. Different nanodroplet sizes were achieved by changing the sonication amplitude. As shown in FIG. 7(*a*), the nanodroplet diameter decreases from approximately 600 nm to 150 nm as the sonication amplitude increases from 20 to 50. Changing the mass ratio of polymer/IONP does not change D50 of the NE while decreasing significantly D90 and increasing D10 of the NE accordingly.

Flow Tests

Figure 8:
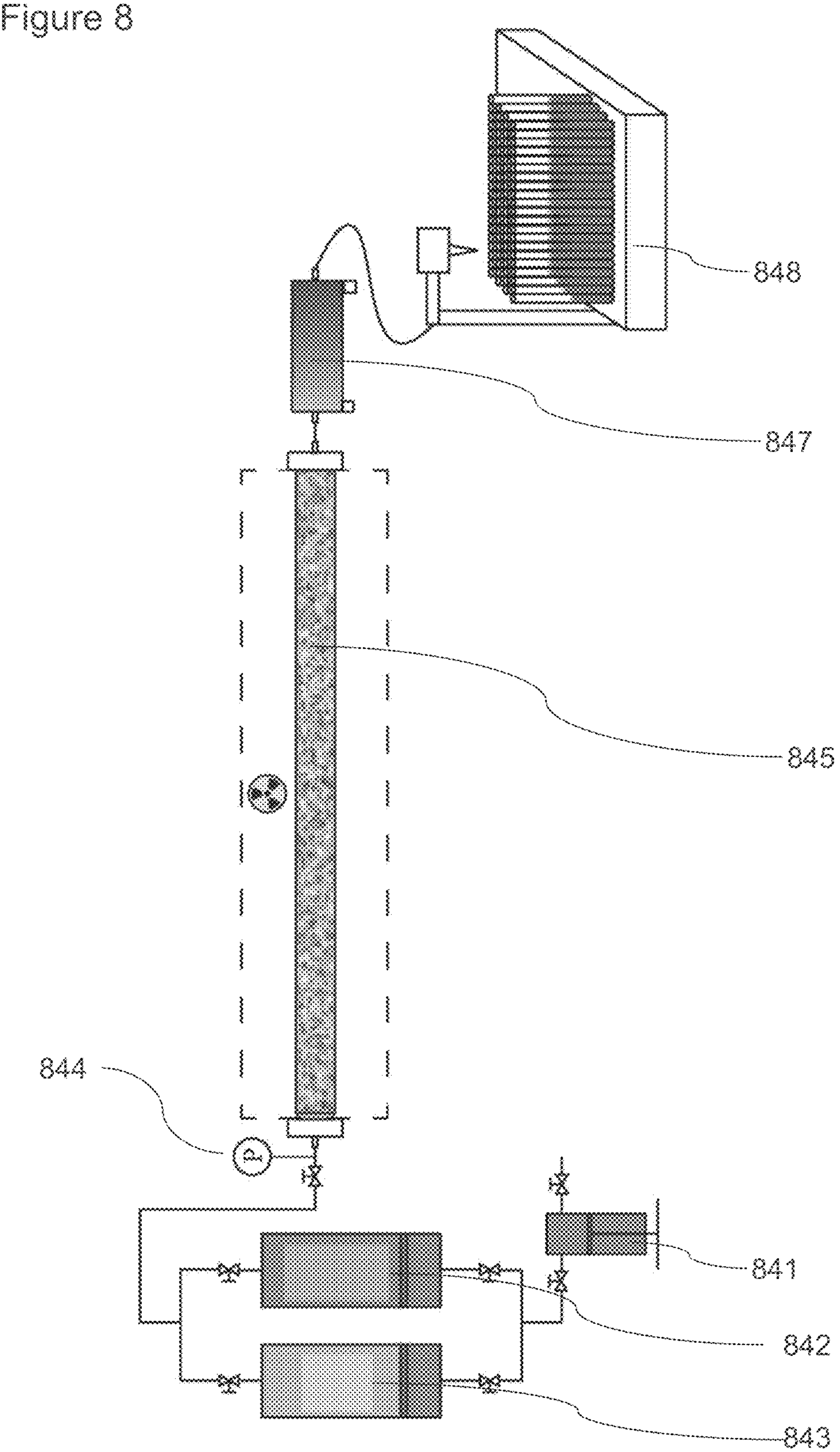
FIG. 8 are graphs of the schematic diagram of the flow tests.

FIG. 8 shows the schematic diagram of the flow tests. The experimental setup consisted of a syringe pump 841 (500D, Teledyne ISCO, Lincoln, NE, USA), two cylinders for separately containing water 842 (or brine) and emulsion 843, a pressure transducer 844 (PX409, OMEGA Engineering inc., Stanford, CT, USA), and the fully saturated sandpack 846. The sandpack displacement was conducted horizontally. In each sandpack flood test, prepared emulsion was firstly injected into the sandpack; subsequently, a period of extended water injection was carried out at a constant flow rate of 0.5 ml/min (at a Darcy velocity of 1.58 m/day). Fluid was collected by a collector 848 at the other end of the sandpack 846 for analysis after passing through densitometer 847.

Effects of droplet size, salinity effect, and mass ratio of polymer/IONP on the retention behavior were investigated.

Table 2 summarizes the chemicals and sonication parameters for flow tests. A total of 16 flow tests were conducted in order to investigate the three variables evaluated in this study, including median droplet size, $CaCl_2 \cdot 2H_2O$ concentration and mass ratio of polymer/IONP as listed in Table 2. As indicated there, the bolded quantities represent different values of the five variables investigated in this study. For each variable studied, other variables were controlled at the same values.

TABLE 2

PIONP properties, NE characteristics and sandpack properties for flow tests. In each case, the PIONP concentration is 2.5 wt. %, the Oil volume fraction is 10 vol. %. The bolded numbers represent the different values of the variables that is investigated.

| | | PIONP properties | | NE characteristics | | | | |
|---|---|---|---|---|---|---|---|---|
| No. | Variable | Mass ratio of polymer/IONP | $CaCl_2$• $2H_2O$ conc. (wt. %) | IFT (mN/m) | Median droplet size (nm) | Per-meability ($\mu m^2$) | Pore Vol. ($cm^3$) | Sandpack properties Porosity (%) |
| 1 | Median | 3.8 | 0 | 35.9 | **150** | 4.6 | 50.1 | 36.5 |
| 2 | droplet | 3.8 | 0 | 35.9 | **250** | 4.7 | 50.8 | 37.0 |
| 3 | size | 3.8 | 0 | 35.9 | **400** | 4.4 | 50.5 | 36.8 |
| 4 | | 3.8 | 0 | 35.9 | **600** | 4.5 | 50.2 | 36.5 |
| 9 | $CaCl_2$• | 3.8 | **0** | 35.9 | 150 | 4.6 | 49.5 | 36.0 |
| 10 | $2H_2O$ | 3.8 | **2.5** | 35.9 | 150 | 4.6 | 49.7 | 36.2 |
| 11 | conc. | 3.8 | **5.0** | 35.9 | 150 | 4.5 | 50.5 | 36.8 |
| 12 | | 3.8 | **10.0** | 35.9 | 150 | 4.6 | 48.5 | 35.3 |
| 13 | Mass | **0.6** | 0 | 50.0 | 150 | 4.5 | 48.9 | 35.6 |
| 14 | ratio of | **0.9** | 0 | 44.9 | 150 | 4.4 | 50.2 | 36.5 |
| 15 | polymer/ | **1.5** | 0 | 41.6 | 150 | 4.6 | 49.5 | 36.0 |
| 16 | IONP | **3.8** | 0 | 35.9 | 150 | 4.7 | 49.7 | 36.2 |

Figure 9:
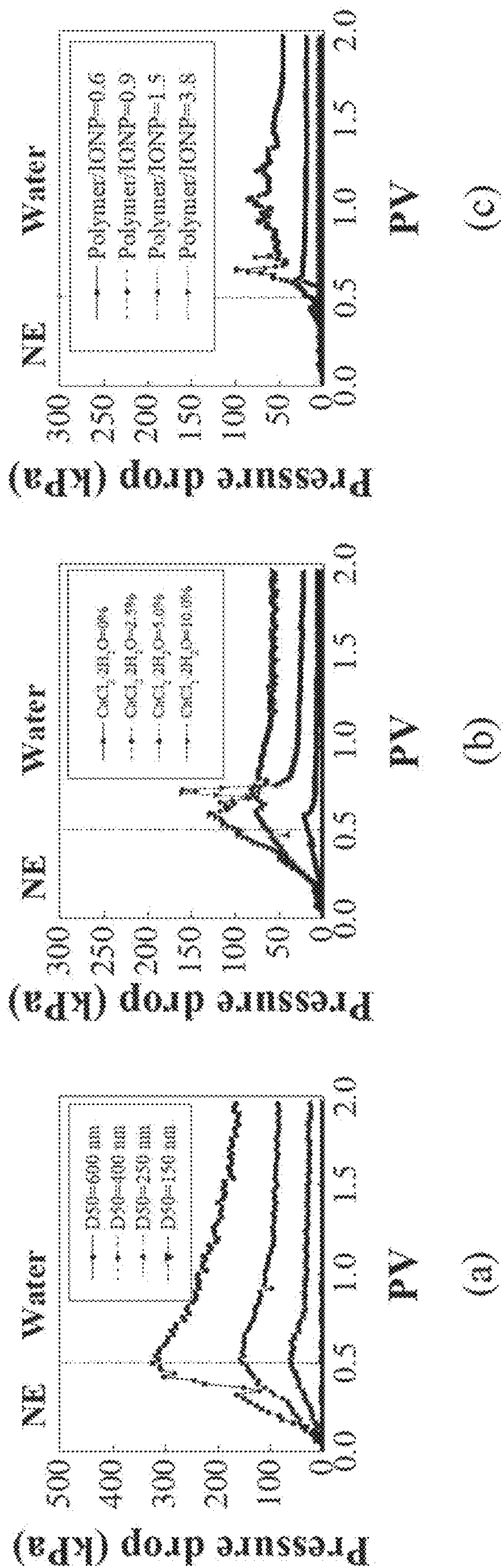
FIGS. 9 (*a-c*) are graphs of the NE flow test results.

FIG. 9(*a*)-(*c*) are graphs of the NE flow test results. The x-axis in each graph is the pore volume of injected fluid. And the y-axis is the pressure drop across the sandpack.

FIG. 9(*a*) shows the effect of different median droplet size and corresponds to experiment numbers 1-4 in table 2. This graph shows that decreasing the droplet size corresponds with a lower pressure drop. FIG. 9(*b*) shows the effect of different $CaCl_2 \cdot 2H_2O$ concentration and corresponds to experiment numbers 9-12 in table 2. This graph shows that decreasing the $CaCl_2 \cdot 2H_2O$ concentration corresponds with a lower pressure drop. FIG. 9(*c*) shows the effect of different mass ratios of polymer/IONP to experiment numbers 13-16 in table 2. This graph shows that increasing the mass ratios of polymer/IONP corresponds with a lower pressure drop. In each case, the vertical line divides the graph between the period during which NE was being injected into one end of the sandpack and period during which water was being injected.

In terms of the results of the flow tests as shown in FIG. 7, reductions in nanodroplet size, $CaCl_2 \cdot 2H_2O$ concentration and mass ratio of IONP/polymer are beneficial for the NE to generate minimal retentions in sandpacks. In the field tests, one can design an optimal NE system by adjusting the nanodroplet size, salinity and mass ratio of polymer/ION P.

An optimum nanoemulsion may correspond to a low peak value of the pressure drop across the sandpack and a low equilibrium pressure drop during the chase water flooding process.

Figure 10:
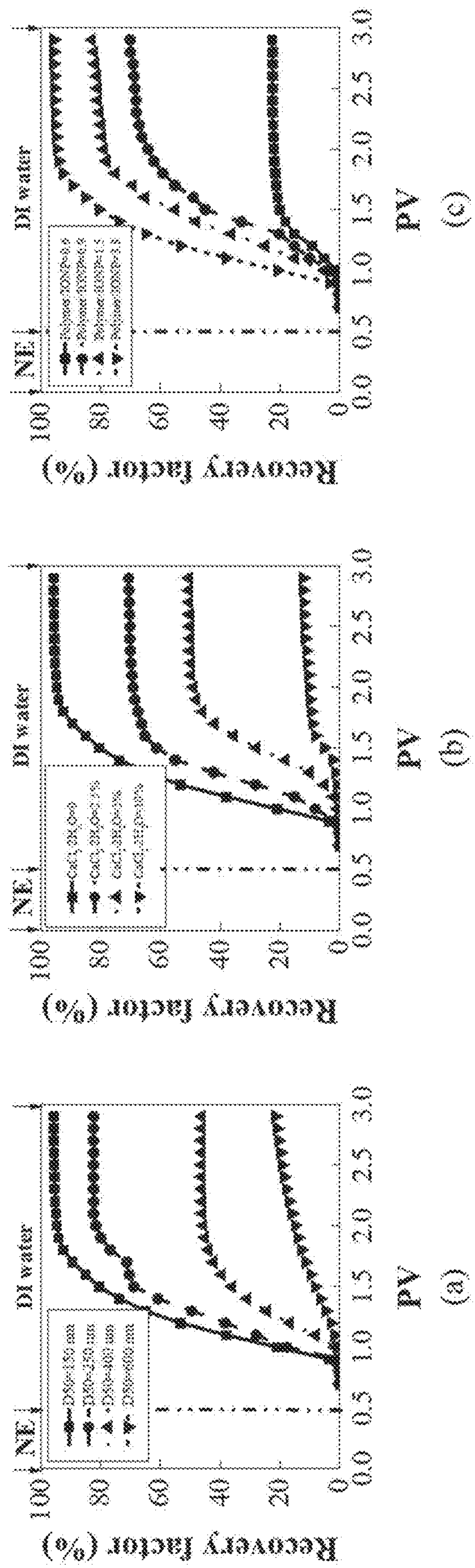
FIGS. 10 (*a-c*) are graphs of the percentage of recovered nanoemulsion for various parameters.

The pressure drop alone may not provide a full picture of the retentions of the nanoemulsions. It just provides the resistance of the nanoemulsion in porous media. FIG. 10 are graphs of the percentage of recovered nanoemulsion for various parameters. In particular, FIG. 10(*a*) shows the recovery for different nanodroplet D50 sizes; FIG. 10(*b*) shows the recovery for different $CaCl_2 \cdot 2H_2O$ concentrations; and FIG. 10(*c*) shows the recovery for different polymer/IONP ratios. As shown in FIG. 10, an effluent analysis also shows that a 98% of the injected nanoemulsions can be fully recovered. The nanoemulsions may be configured (e.g., by adjusting the parameters listed above) to show a greater recovery factor.

To design an optimal nanoemulsion system, core flooding tests may be performed by using the targeted core sample and formation water. By adjusting the nanodroplet size, salinity, and mass of the coating, volume fraction of the oil, and mass fraction of the magnetic nanoparticles, minimal retention in cores can be obtained from the core flooding tests. And this optimal nanoemulsion system can be applied to the subsurface for flow back analysis.

Materials and Methods

Chemicals

To make the nanoemulsion, calcium chloride dihydrate ($CaCl_2 \cdot 2H_2O$), poly(4-styrenesulfonic acid-co-maleic acid) sodium salt-20 kD (PSS-co-MA), hydrochloric acid, and 1-octadecene (95%) were obtained from Sigma-Aldrich™. Iron oxide ($Fe_3O_4$) nanoparticles were provided by US Research Nanomaterials, Synthesis of Polymer-Coated Iron Oxide Nanoparticles PIONPs were synthesized by sonicating PSS-co-MA and IONPs. A total of 500 mL of Mili-Q™ water was firstly poured into a 600 mL clean beaker. The pH of the water was adjusted to 5 by adding concentrated HCl. Then, and 20 g of PSS-co-MA and 5 g of IONPs were added to the aqueous phase followed by homogenization for 10 min and ultrasonication for 60 min at 50% amplitude in an ice bath. To remove non-coated IONPs, after sonication, the solution was centrifuged for 40 min at 4,000 rpm. Finally, the supernatant was processed by four steps of concentrating and washing with DI water using 50,000 D centrifugal filter units (Amicon®Ultra-12, 100 kDa). After three times of centrifuges, the concentration of PIONP ranges from 15% to 25%.

Colloidal Stability of PIONPs

The colloidal stability was firstly tested through bottle screening tests. The PIONPs suspend in the aqueous phase very well with no phase separation for at least 12 months. To evaluate the colloidal stability of PIONPs, DLS measurements at room temperature (22° C.) and zeta potential analyses were conducted using a Malvern™ Zetasizer Nano ZSP™ instrument.

For the nanoemulsion stability in acid conditions, six different pH values (1, 3, 5, 7, 9, 11) were examined for their effects on nanoemulsion stability. The emulsions can be successfully generated under all different pH environments. The bottle screening tests showed that the nanoemulsion has the best stability under a pH of 5 while showing a phase separation below a pH of 5. And the acid accelerates the phase separation of the nanoemulsion. However, this stability behavior of the nanoemulsions was examined under static conditions. For the dynamic transport process in the subsurface especially during the fracturing process, the high shear rate should be helpful to maintain the nanoemulsion stabilization. Therefore, these nanodroplets can be sufficiently stable for acid fracturing.

Structural Characterization of PIONPs

The inorganic and organic content of PIONPs were determined using inductively coupled plasma-mass spectrometry (ICP-MS) to measure Fe content in the core and S content in the polymer shell. The iron and sulfur content of NPs is measured in milligrams per liter. The weight ratio of iron oxide to polymer is approximately 1:4. For TGA analysis, an 80 μL sample (PIONPs, 0.1 mg/mL $Fe_3O_4$) was loaded into a pan, which was supported by a precision balance. Then, the sample was heated at the ramp rate of 10° C./min to 75° C. and kept at 75° C. for 30 min under a nitrogen atmosphere, followed by heating to 1000° C. at the ramp rate of 10° C./min.

The inorganic size and shape were imaged using Scanning electron microscopy instrument. A dilute aqueous solution of PIONPs was deposited onto an ultrathin carbon-coated copper grid (200 mesh). The size distribution of IONPs encapsulated by polymers was determined by the ImageJ™ analysis. Images used in this analysis are shown in FIG. 3.

Synthesis and Colloidal Stability of the Nanoemulsions

The concentrated PIONP nanofluid was firstly diluted to 2.5 wt. % and then was utilized to emulsify the n-dodecane with a volume fraction of 10 vol. %. High energy emulsification method was applied into the nanofluid-oil mixture by ultrasonication (30 min, 30 s/30 s, 50%) to generate a significant oil-water interface area where more nanoparticles can be attached, thus emulsifying the nanodroplets. Four different concentrations of $CaCl_2 \cdot 2H_2O$ were added to each nanoemulsion system to examine the salinity effects.

Immediately after the nanoemulsions were generated, each nanoemulsion was characterized via its stability behavior, nanodroplet size distribution, rheological behavior, and zeta potential. The nanoemulsion stability was evaluated through vial tests by observing the phase separation and emulsion creaming at different time intervals after the emulsification. Nanodroplet size distribution and nanodroplet zeta potential were determined through the DLS method via Malvern™ Zetasizer Nano ZSP™ instrument. Rheological behavior was assessed through a rheometer (Dynamic Shear Rheometer, SmartPave 92, Anton Paar).

Horizontal Well

Figure 11:
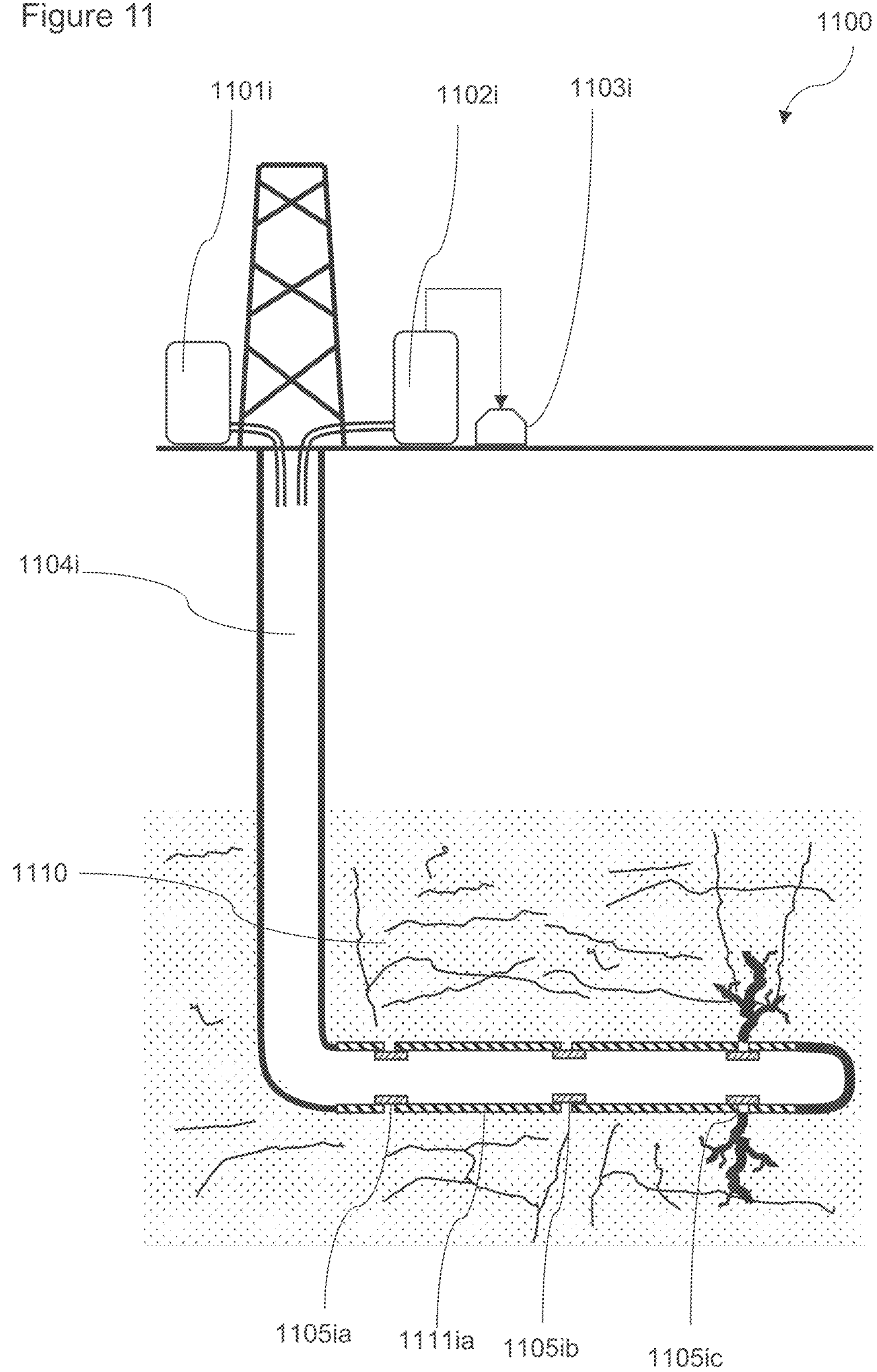
FIG. 11 is a schematic view of a further embodiment of a frac assembly with a horizontal well.

FIG. 11 shows an embodiment of a frack assembly 1100 comprising a horizontal well 1104*i*, at least one source of frac fluid 1101*i*, a vessel 1102*i* for capturing fluids extracted from the well, and an analyser 1103*i*, for analysing respective extracted fluids.

In the situation shown in FIG. 11, the horizontal well 1104*i* is in the process of being fracked.

The well 1104*i* in this case comprises a series of three frac stages 1105*ia*, 1105*ib*, 1105*ic*. It will be appreciated that wells may have many more frac stages (e.g., up to 10-50 or more). This allows different portions of a formation 1110 to be successively fracked.

In the situation shown in FIG. 1, the first stage 1105*ic* furthest away from the surface has been fracked. A variety of systems may be used to control the opening and closing of each frac stage, including, for example, ball drop, sliding sleeves etc.

In this case, the formation itself comprises a network of channels which would facilitate fluid flow through the formation.

Fracking of the first stage is effected by injecting a fluid downhole from the frac fluid source under pressure. The pressure is sufficient to generate fractures in the rock which are then filled with the fracking fluid. In this case, the frac fluid comprises a carrier liquid (e.g., water), proppant (e.g., sand or aluminum oxide), and droplets. The fractures are filled with fracking fluid when the pressure is applied. When the pressure is released after the fractures have been created, the proppant present helps prevent the fractures from collapsing. In this way, a permanent fluid network of fractures is formed.

The nanodroplets in this case form a nanoemulsion with the carrier fluid. The droplets in this case are liquid nanodroplets which are stabilized by polymer-coated iron oxide nanoparticles. In other embodiments, the frac fluid may also comprise a thickening agent or other additives (e.g., acid).

To analyse the fluid conductivity of the formation (which includes the channels and pores and the fractures), the well is allowed to produce, and fluid is extracted from the formation. Fluid extracted from the formation may include fluid which had been injected into the formation and then recovered and/or fluid which was already present in the formation and extracted for the first time (e.g., formation brine and/or hydrocarbons).

If the nanoemulsion tracer is not extracted from the well during production, this may indicate that the stimulated area around the injection well has a fluid conductivity so large that it is able to propagate the injected tracer beyond both wells.

If the nanoemulsion tracer is extracted from the injection well, the rate at which the nanoemulsion tracer is extracted may provide additional information on the fluid network.

For example, in a graph of extracted tracer against time, a single well-defined peak may indicate a highly fractured system in which the tracers can move easily. In contrast, a graph showing several temporally spaced peaks, may indicate a sparsely fractured system where each peak corresponds to a separate fracture. In this scenario, the graph represents the aggregated recovery of the tracer, and each peak can be associated with a different fracture.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A method for analysing a fluid conductivity of a fluid network within an underground formation, the method comprising:

injecting a nanoemulsion from a surface into the underground formation, the nanoemulsion comprising dispersed liquid nanodroplets in a carrier liquid, wherein the nanodroplets are stabilized within the carrier liquid by solid nanoparticles located at an interface between the dispersed liquid nanodroplets and the carrier fluid, the solid nanoparticles having an affinity to be wetted by both the dispersed liquid of the nanodroplets and the carrier liquid and comprising: a core comprising iron; and a polymer coating, and wherein the nanodroplets are configured to remain stable and dispersed while in the formation; and measuring a parameter of the nanodroplets after the nanodroplets have been injected into the underground formation to determine a fluid conductivity of the underground formation, wherein the nanoparticles are paramagnetic, and wherein measuring the parameter comprises: measuring magnetic properties of the nanoemulsion while applying a magnetic field to the solid nanoparticles aligning themselves to the applied magnetic field, and then removing the applied magnetic field from the solid nanoparticles losing their magnetic moment.

2. The method according to claim 1, wherein the method comprises generating the fluid network by fracking, wherein the fracking comprises injecting a frac fluid into the underground formation, wherein the frac fluid comprises the nanoemulsion.

3. The method according to claim 2, wherein the frac fluid comprises a proppant.

4. The method according to claim 2, wherein the fracking comprises multiple frac stages, each frac stage corresponding to a volume of the frac fluid being injected into a different spatial region of the underground formation, wherein the injected nanodroplets in each frac volume associated with each stage are identifiably different.

5. The method according to claim 1, wherein the method comprises extracting fluid from the underground formation, and wherein the parameter is measured of the extracted fluid.

6. The method according to claim 1, wherein the method comprises measuring a parameter of the nanodroplets while they are in the underground formation.

7. The method according to claim 6, wherein the measuring of the parameter comprises: applying an oscillating magnetic field to the dispersed liquid nanodroplets in the underground formation; and detecting an electromagnetic response of the dispersed liquid nanodroplets to the oscillating magnetic field.

8. The method according to claim 1, wherein the solid nanoparticles comprise iron oxide.

9. The method according to claim 1, wherein a hydrodynamic diameter of the nanodroplets is less than 1 μm and at least 100 nm.

10. The method according to claim 1, wherein the nanodroplets have maximum dimension of between 100 nm and 1 μm.

11. The method according to claim 1, wherein the nanoemulsion is injected into the underground formation via an injection well and at least a one-well portion of the injected nanoemulsion is extracted from the underground formation via the injection well.

12. The method according to claim 1, wherein the nanoemulsion is injected into the underground formation via an injection well and at least an inter-well portion of the injected nanoemulsion is extracted from the underground formation via a production well, the production well being different from the injection wellbore.

13. The method according to claim 1, wherein the dispersed liquid nanodroplets comprise hydrocarbons.

14. The method according to claim 1, wherein the carrier liquid comprises brine.

15. The method according to claim 1, wherein the nanodroplets are generally spherical.

16. The method according to claim 1, wherein the mass ratio of the polymer coating to core is between 0.6-3.8.

17. The method according to claim 1, wherein a zeta potential of the injected nanoemulsion is between −70 and −15 mV.

18. The method according to claim 1, wherein the core comprises one or more of: ferrite nanoparticles, maghemite, and magnetite.

* * * * *